Dec. 17, 1935.   D. E. NORTHROP ET AL   2,024,246
METHOD OF REFINING ORGANIC ACID ESTERS OF CELLULOSE
Filed May 5, 1933
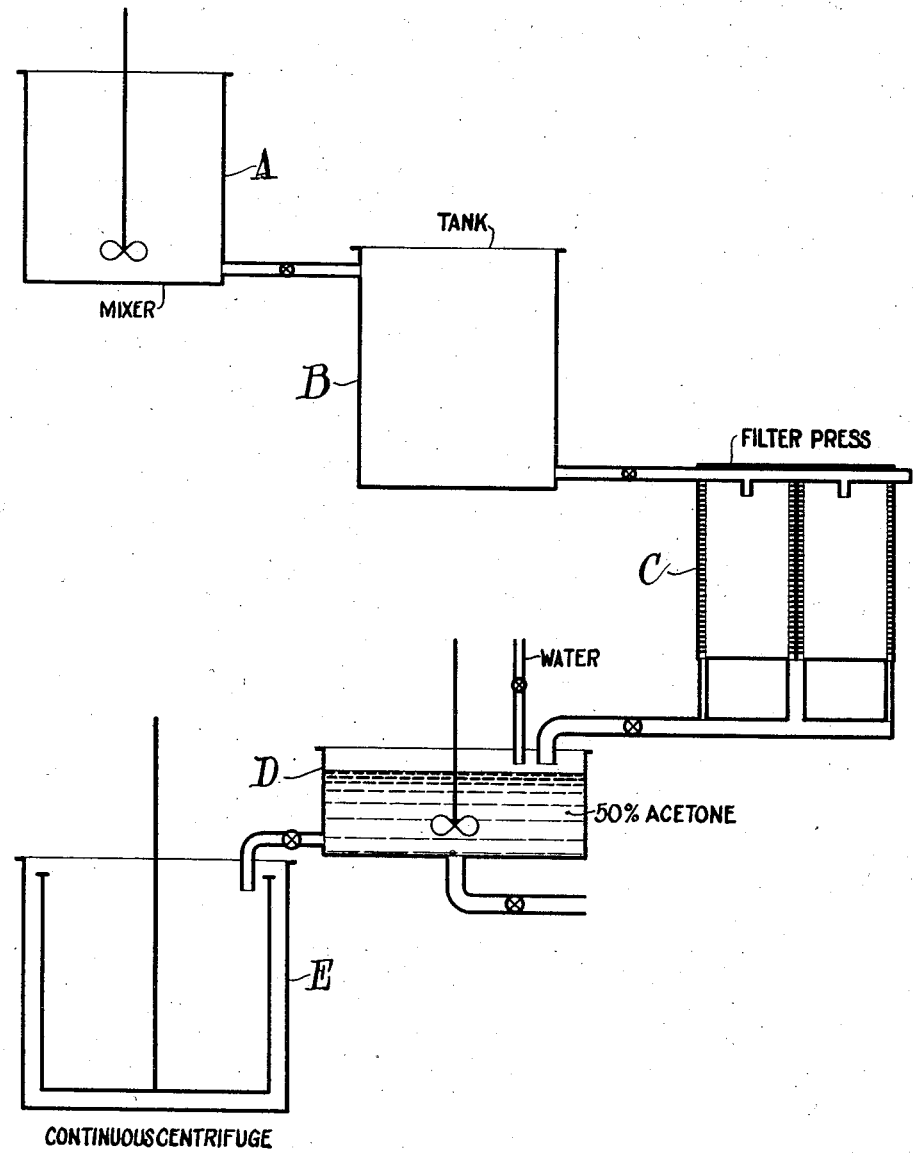
Dennis E. Northrop & Robert C. Burton,
Inventors Patented Dec. 17, 1935

2,024,246

UNITED STATES PATENT OFFICE 2,024,246

METHOD OF REFINING ORGANIC ACID ESTERS OF CELLULOSE

Dennis E. Northrop and Robert C. Burton, Kingsport, Tenn., assignors to Eastman Kodak Company, Rochester, N. Y., a corporation of New York Application May 5, 1933, Serial No. 669,546

8 Claims. (Cl. 260—102)

The present invention relates to the refining of an organic acid ester of cellulose by dissolving it in a liquid in which it is soluble, such as aqueous acetone, filtering the solution formed and then precipitating the ester in an aqueous acetone in which the ester is insoluble.

In some instances in which cellulose esters are employed, such as in laminated glass, photographic film, etc., it often becomes important that the ester be free from haze and dust particles and that it be capable of withstanding conditions, such as heat and intense light, which are met with in use, for instance, from intense sunlight or in a cinema projector. The presence of haze and discoloration in much of the laminated glass now employed is common knowledge and is an argument against the universal adoption of this type of glass especially where danger from shattering and clearness of vision are important.

One object of our invention is to provide a satisfactory means of refining cellulose acetate to obtain a product of excellent clarity and of freedom from haze and dust particles, which will be stable to the effects of the elevated temperatures and light intensities ordinarily met with. Another object of our invention is to prepare the cellulose acetate in a granular form so that solutions thereof may be readily prepared or in fact it may be readily susceptible to any other treatment which it is desired to administer thereto. A further object of our invention is to provide a process in which the particle size of the cellulose acetate may be regulated and in which a product is obtained in which that size is uniform.

We have found that any danger of haze or dust particles being present in an organic acid ester of cellulose may be eliminated, that its clarity and stability may be enhanced, and, that any jelly particles of unstable or difficultly stable material may be removed, and that a product of uniform particle size may be obtained by filtering a solution of the ester and controlling the precipitation thereof. We have found that the ester resulting from this treatment is resistant to the action of elevated temperatures, actinic light rays, and other agencies which affect the clarity and increase the haze of sheets or ordinary commercial cellulose acetate.

In carrying out our process, an acetone-soluble organic acid ester of cellulose is first dissolved in a cellulose ester solvent. The solution is then run through one or more filtering sheets or membranes, preferably under pressure, and the filtered solution is then treated with an aqueous solution of said solvent in which the ester will be precipitated from solution. The precipitating bath is preferably so regulated as to maintain it at a constant concentration, despite the continuous introduction of cellulose ester solution thus assuring a uniform particle size of the precipitate.

The accompanying diagram illustrates a combination of apparatus which may be employed for the carrying out of a process in accordance with our invention. The cellulose ester may be dissolved in a solvent in the mixer A after which it may run by gravity or be pumped into a storage tank B from which it is forced into the filter press C either by the weight of the solution in tank B or preferably by means of a pump. Obviously if desired the solution may be refiltered by including a second filter press in the combination and in practice such procedure is preferred. The filtered solution may then be lead into a precipitating tank D containing aqueous acetone of a concentration in which the cellulose ester is insoluble, under constant agitation. As the solution is led into the precipitating tank water is continuously added to assure a constant concentration of the precipitating bath. After completing the precipitation the acetone is diluted with water to prevent subsequent coagulation. The resulting mass containing the cellulose ester in suspension may then be led to the centrifuge E to separate the liquid from the solid particles.

The following specific example illustrates the carrying out of a process of refining an acetone soluble cellulose acetate according to our invention:

100 lbs. of an acetone-soluble cellulose acetate having an acetyl content of about 38% was dissolved in a mixture consisting of 350 lbs. of acetone and 116 lbs. of water. This solution was then filtered first through a double thickness of canton flannel and then through three thicknesses of filter paper supported by a heavy cotton fabric, such as heavy duck. This twice filtered dope was then pumped, preferably in a small stream, into agitated 50% aqueous acetone in which the ester was insoluble. During this precipitation the acetone concentration in the precipitator was maintained at approximately 50% by simultaneously adding to the precipitator while the ester solution was being added, with vigorous agitation, sufficient water to dilute the aqueous acetone in the dope introduced to 50% concentration. The temperature was maintained at 25–30° C. However, the temperature may be varied according to the desired particle size of the precipitate. The lower the temperature, the more readily the acetate will precipitate and the smaller will be the particle size, other things being equal. When the precipitation was completed, enough water was added to reduce the acetone concentration to 20-25% after which the cellulose acetate was separated from the suspension by centrifuging. The acetate was then washed with distilled water and dried. The resulting product consisted of small granules of cellulose acetate of about 8-12 mesh size.

The physical form and size of the precipitated product may be regulated by varying the concentration of acetone in the precipitating bath. The lower the acetone concentration the more fibrous the particles of the resulting product will be. For example, the water concentration of the precipitating fluid may range from 45-50% (depending on the particular ester) in order to obtain a product of fine granular particles. If the water concentration is maintained at 65%, the resulting precipitate will consist of large fibrous particles. In order to obtain the finest particle size, the concentration of the aqueous acetone employed in the precipitating bath should be that which just precipitates the cellulose ester from its solution. As was pointed out, the concentration of water which may be employed in the precipitating bath will differ according to the ester employed. For instance a cellulose acetate having an acetyl content of 40% will precipitate out in an aqueous acetone having a lower water content than a like cellulose acetate which has been hydrolyzed down to an acetyl content of 37%. The susceptibility of an organic acid ester of cellulose to precipitation in aqueous acetone is related to its precipitation value, as is disclosed in U. S. Patent No. 1,878,953 of C. J. Malm.

Although it is preferred that the aqueous acetone which is employed to dissolve the cellulose ester prior to filtration have an acetone concentration between approximately 75% and 85%, this concentration may be varied outside these limits if the individual operator so desires provided, of course, the ester dissolved properly. In the case of cellulose acetate, the further its hydrolysis is carried out after a certain point, other things being equal, the more dilute may be the aqueous acetone, which will dissolve the acetate. Consequently, the selection of the particular aqueous acetone suitable for the dissolving of the cellulose ester to be refined in each particular instance is left to the judgment of the individual operator. For instance, the concentration of acetone used in the various processes carried out according to our invention may range from 50% up to as much as 95% or even more. In the selection of a suitable concentration of the aqueous acetone for dissolving the ester it is well to keep in mind that the viscosity of the solution should preferably be kept low to facilitate the passage of the solution through the filter, and, that the aqueous acetone of a concentration which will give a solution of the particular ester having the minimum viscosity will in most cases be that selected. In the case of a cellulose acetate the concentration employed will be dependent on the degree of hydrolysis of the acetate, as the further the ester has been hydrolyzed the higher may be the water content of the aqueous acetone which will give a solution having the minimum viscosity.

As has been pointed out herein, various organic acid esters of cellulose, other than cellulose acetate, such as cellulose acetate propionate, cellulose acetate butyrate, cellulose acetate propionate butyrate and the like may be refined by processes as carried out in accordance with our invention.

The product prepared according to our invention, due to its fine particle size, may be employed especially in situations where a cellulose ester which is more readily susceptible to action of various agents, such as solvents, is desired. For instance, a cellulose acetate resulting from our invention will dissolve more quickly in an organic solvent in which it is soluble than an untreated cellulose acetate of the same kind. Also, due to its clarity and freedom from impurities and haze, cellulose esters refined by our invention are especially suited for use in products in which transparency is of importance, such as in laminated glass or photographic film. These refined esters especially those of particularly fine particle size, such as 40 mesh or finer, may be employed in the manufacture of molding powders which when subjected to heat and pressure form molded products of good quality.

We claim as our invention:

1. A method of refining an organic acid ester of cellulose which comprises dissolving the ester in an aqueous acetone in which the ester is soluble, filtering the solution thus formed, and then substantially completely precipitating the ester from its solution by gradually adding the filtered solution to an agitated aqueous acetone in which the ester is substantially insoluble, which aqueous acetone is maintained at approximately constant concentration over substantially the entire precipitation period.

2. A method of refining an organic acid ester of cellulose which comprises dissolving the ester in an aqueous acetone in which the ester is soluble and which contains from about 50% to about 95% acetone, filtering the solution thus formed, and then substantially completely precipitating the ester from its solution by gradually adding the filtered solution to an agitated aqueous acetone in which the ester is substantially insoluble and which contains from 50% to 35% acetone, which aqueous actone is maintained at approximately constant concentration over substantially the entire precipitation period.

3. A method of refining an organic acid ester of cellulose which comprises dissolving the ester in an aqueous acetone in which the ester is soluble and which contains from about 75% to about 85% acetone, filtering the solution thus formed, and then substantially completely precipitating the ester from its solution by gradually adding the filtered solution to an agitated aqueous acetone in which the ester is substantially insoluble and which contains from 50% to 35% acetone, which aqueous acetone is maintained at approximately constant concentration over substantially the entire precipitation period.

4. A method of refining an organic acid ester of cellulose which comprises dissolving the ester in an aqueous acetone in which the ester is soluble and which contains from about 75% to about 85% acetone, filtering the solution thus formed, and then substantially completely precipitating the ester from its solution by gradually adding the filtered solution to an agitated aqueous acetone in which the ester is substantially insoluble and which contains from 50% to 45% acetone, which aqueous acetone is maintained at approximately constant concentration over substantially the entire precipitation period.

5. A method of refining an acetyl-containing organic ester of cellulose, which comprises dissolving the ester in an aqueous acetone in which the ester is soluble, filtering the solution thus formed, and then substantially completely precipitating the ester from its solution by gradually adding the filtered solution to an agitated aqueous acetone in which the ester is substantially insoluble, which aqueous acetone is maintained at approximately constant concentration over substantially the entire precipitation period.

6. A method of refining cellulose acetate which comprises dissolving the acetate in an aqueous acetone in which the acetate is soluble and which contains from about 75% to about 85% acetone, filtering the solution thus formed, and then substantially completely precipitating the acetate from its solution by gradually adding the filtered solution to an agitated aqueous acetone in which the acetate is substantially insoluble and which contains from 50% to 35% acetone, which aqueous acetone is maintained at approximately constant concentration over substantially the entire precipitation period.

7. A method of refining cellulose acetate, which comprises dissolving the acetate in an aqueous acetone in which the acetate is soluble and which contains from about 75% to about 85% acetone, filtering the solution thus formed, and then substantially completely precipitating the acetate from its solution by gradually adding the filtered solution to an agitated aqueous acetone in which the acetate is substantially insoluble and which contains from 50% to 35% acetone, which aqueous acetone is maintained at approximately constant concentration over substantially the entire precipitation period.

8. A method of refining cellulose acetate, which comprises dissolving the acetate in an aqueous acetone in which the acetate is soluble and which contains from about 75% to about 85% acetone, filtering the solution thus formed, and then substantially completely precipitating the acetate from its solution by gradually adding the filtered solution to an agitated aqueous acetone in which the acetate is substantially insoluble and which contains from 50% to 45% acetone, which aqueous acetone is maintained at approximately constant concentration over substantially the entire precipitation period.

DENNIS E. NORTHROP.
ROBERT C. BURTON.